(12) United States Patent
Xie et al.

(10) Patent No.: US 8,829,130 B2
(45) Date of Patent: Sep. 9, 2014

(54) RESIN COMPOSITION AND MOLDED ARTICLE

(75) Inventors: Xuming Xie, Beijing (CN); Haruhisa Masuda, Settsu (JP)

(73) Assignees: Tsinghua University, Beijing (CN); Daikin Industries, Ltd., Osaka (JP)

( * ) Notice: Subject to any disclaimer, the term of this patent is extended or adjusted under 35 U.S.C. 154(b) by 0 days.

(21) Appl. No.: 13/808,039

(22) PCT Filed: Jun. 27, 2011

(86) PCT No.: PCT/JP2011/064662
§ 371 (c)(1),
(2), (4) Date: Jan. 2, 2013

(87) PCT Pub. No.: WO2012/005133
PCT Pub. Date: Jan. 12, 2012

(65) Prior Publication Data
US 2013/0109810 A1    May 2, 2013

(30) Foreign Application Priority Data

Jul. 5, 2010    (CN) .......................... 2010 1 0218794

(51) Int. Cl.
*C08F 12/20*    (2006.01)
*C08F 16/24*    (2006.01)
*C08K 5/07*    (2006.01)

(52) U.S. Cl.
USPC ............................. 526/242; 526/247; 525/153

(58) Field of Classification Search
USPC .................................. 525/153; 526/242, 247
See application file for complete search history.

(56) References Cited

U.S. PATENT DOCUMENTS

| 4,578,427 | A  | 3/1986 | Saito et al. |
| 2004/0102572 | A1 | 5/2004 | Kubo et al. |

FOREIGN PATENT DOCUMENTS

| JP | 58-176242 | A | 10/1983 |
| JP | 60-155275 | A | 8/1985 |
| JP | 2-212539 | A | 8/1990 |
| JP | 6-136255 | A | 5/1994 |
| JP | 6-316686 | A | 11/1994 |
| JP | 8-48887 | A | 2/1996 |
| JP | 10-195302 | A | 7/1998 |
| JP | 2006-274073 | | * 10/2006 |
| JP | 2006-274073 | A | 10/2006 |
| JP | 2009-52028 | A | 3/2009 |
| JP | 2009-68390 | A | 4/2009 |
| WO | 89/00175 | A1 | 1/1989 |
| WO | 03044093 | A1 | 5/2003 |

OTHER PUBLICATIONS

International Search Report for PCT Appln. No. PCT/JP2011/064662.
International Preliminary Report on Patentability issued Feb. 12, 2013 for corresponding PCT/JP2011/064662, together with the Written Opinion of the International Searching Authority.

* cited by examiner

*Primary Examiner* — William Cheung
(74) *Attorney, Agent, or Firm* — Sughrue Mion, PLLC

(57) ABSTRACT

A resin composition including an aromatic polyether ketone resin (I), and a fluororesin (II), the fluororesin (II) being a copolymer of tetrafluoroethylene and a perfluoroethylenic unsaturated compound represented by the following formula (I):

$$CF_2=CF-R_f^1 \qquad (1)$$

wherein $R_f^1$ represents $-CF_3$ or $-OR_f^2$, and $R_f^2$ represents a C1 to C5 perfluoroalkyl group; the composition containing the aromatic polyether ketone resin (I) and the fluororesin (II) at a mass ratio (I):(II) of 95:5 to 50:50; the fluororesin (II) being dispersed as particles in the aromatic polyether ketone resin (I) and having an average dispersed particle size of 3.0 µm or smaller.

7 Claims, No Drawings

RESIN COMPOSITION AND MOLDED ARTICLE

CROSS REFERENCE TO RELATED APPLICATIONS

This application is a National Stage of International Application No. PCT/JP2011/064662, filed on Jun. 27, 2011, which claims priority from Chinese Patent Application No. 201010218794.0 filed on Jul. 5, 2010, the contents of all of which are incorporated herein by reference in their entirety.

TECHNICAL FIELD

The present invention relates to a resin composition and a molded article.

BACKGROUND ART

Switching from metal components to resin components has recently been actively studied for the purposes of weight saving and cost reduction. The studies have led to practical use of vehicle components, industrial components, and electrical and electronic components formed using a thermoplastic resin such as a polyamide resin, a polycarbonate resin, and a polyacetal resin. Also for use as sliding members including gears and bearing retainers, metal sliding members have been more and more replaced by resin sliding members. These thermoplastic resins, however, are insufficient in sliding properties, as the sliding members are used under high load, high temperature, and high-speed rotation conditions. Thermoplastic resins therefore may cause problems such as wear, fusion, cracking, and chipping.

Meanwhile, fluororesins are excellent in sliding properties, heat resistance, chemical resistance, solvent resistance, weather resistance, flexibility, electrical properties, and other properties, and are thus used in a variety of fields including cars, industrial machines, OA equipment, and electrical and electronic equipment. Particularly, fluororesins have excellent sliding properties, and are one of the resins having a notably low friction coefficient. Fluororesins, however, have inferior mechanical properties and physical heat resistance represented by deflection temperature under load, compared to crystalline heat-resistant thermoplastic resins in many cases. Also, in some cases, fluororesins have inferior dimensional stability compared to amorphous heat-resistant thermoplastic resins. Hence, the range of use of fluororesins has been limited.

Accordingly, thermoplastic resins have been studied for the purpose of improving their sliding properties and applying them to sliding members in wider fields. For example, Patent Literature 1 discloses a resin composition containing 1 to 50 parts by weight in total of a fluororesin and graphite for each 100 parts by weight of a resin composition that consists of 60 to 99 parts by weight of a thermoplastic resin having a heat deformation temperature of 100° C. or higher and 40 to 1 part by weight of carbon fibers. Patent Literature 2 discloses a resin composition containing a thermoplastic resin (A) having a molding temperature of 300° C. or higher, and a polymer (B) obtained by polymerization of an essential component of fluoroacryl α-fluoroacrylate that has a specific structure.

Fluororesins are also known to be added to a thermoplastic resin for purposes other than improvement of the sliding properties. For example, Patent Literature 3 discloses a technique of improving the mold-processability, including decreasing the extrusion pressure and extrusion torque, in the mold-processing of engineering plastics. The technique includes adding 0.005 to 1% by mass of a fluoropolymer based on the total mass of the engineering plastics and the fluoropolymer. Patent Literature 4 discloses a technique of mixing PEEK resin fine powder in a water dispersion of a PFA resin at a PFA:PEEK weight ratio of 75:25 to 70:30, directly applying the dispersion to a roughened metal surface in accordance with common methods, and baking the resulting product, so that a PFA-PEEK compound coating film having adhesion durability is formed.

Polyether ether ketone (PEEK) resin has comparatively favorable sliding properties among the thermoplastic resins, and thus has been put into practical use for sliding members such as a gear and a bearing retainer. The sliding properties, however, are not sufficient under severe sliding conditions such as high load. To improve the sliding properties of PEEK, PEEK compositions containing PTFE powder were developed and are available. The PEEK compositions containing PTFE powder indeed have a decreased coefficient of kinetic friction, but have low sliding properties which are represented by a limiting PV value. For this reason, the sliding properties are desired to be further improved.

CITATION LIST

Patent Literature

| | |
|---|---|
| Patent Literature 1: | JP H8-48887 A |
| Patent Literature 2: | JP H10-195302 A |
| Patent Literature 3: | WO 2003/044093 |
| Patent Literature 4: | JP H6-316686 A |

SUMMARY OF INVENTION

Technical Problem

The present invention therefore aims to provide a resin composition that enables to obtain a molded article having both a low coefficient of kinetic friction and a high limiting PV value.

Solution to Problem

The present inventors have found that the coefficient of kinetic friction and the limiting PV value greatly increase in the case that the fluororesin finely dispersed in an aromatic polyether ketone resin has an average dispersed particle size in the order of thousands of nanometers.

That is, one aspect of the present invention is a resin composition including an aromatic polyether ketone resin (I), and a fluororesin (II), the fluororesin (II) being a copolymer of tetrafluoroethylene and a perfluoroethylenic unsaturated compound represented by the following formula (1):

$$CF_2=CF-R_f^1 \qquad (1)$$

wherein $R_f^1$ represents $-CF_3$ or $-OR_f^2$, and $R_f^2$ represents a C1 to C5 perfluoroalkyl group;

the composition including the aromatic polyether ketone resin (I) and the fluororesin (II) at a mass ratio (I):(II) of 95:5 to 50:50;

the fluororesin (II) being dispersed as particles in the aromatic polyether ketone resin (I) and having an average dispersed particle size of 3.0 μm or smaller.

The fluororesin (II) preferably has an average dispersed particle size of 0.30 μm or smaller.

The fluororesin (II) preferably has a melt flow rate of 0.1 to 100 g/10 min.

The aromatic polyether ketone resin (I) is preferably a polyether ether ketone.

Another aspect of the present invention is a molded article including the above resin composition.

The molded article can be used as a sliding member. Particularly, the molded article can be used, for example, as a sealant, gear, actuator, piston, bearing, or bushing.

Advantageous Effects of Invention

Since the resin composition of the present invention has the above structure, a molded article having a low coefficient of kinetic friction and a high limiting PV value can be obtained. The molded article to be obtained also has excellent sliding properties.

DESCRIPTION OF EMBODIMENTS

The present invention is described in detail below.

The present invention relates to a resin composition containing an aromatic polyether ketone resin (I) and a fluororesin (II).

The above aromatic polyether ketone resin (I) is preferably at least one selected from the group consisting of polyether ketone, polyether ether ketone, polyether ketone ketone, and polyether ketone ether ketone ketone. The aromatic polyether ketone resin (I) is more preferably at least one selected from the group consisting of polyether ketone and polyether ether ketone, and still more preferably polyether ether ketone.

The above aromatic polyether ketone resin (I) preferably has a melt viscosity of 0.05 to 0.50 kNsm$^{-2}$ at 1000 sec$^{-1}$ and 400° C. A melt viscosity in the above range can improve the processing properties, leading to a low coefficient of kinetic friction and a high limiting PV value. The lower limit of the melt viscosity is preferably 0.10 kNsm$^{-2}$. The upper limit of the melt viscosity is preferably 0.45 kNsm$^{-2}$.

The aromatic polyether ketone resin (I) preferably has a glass transition temperature of 130° C. or higher, more preferably 135° C. or higher, and still more preferably 140° C. or higher. A glass transition temperature in the above range enables to obtain a resin composition having excellent heat resistance. The glass transition temperature is measured by a differential scanning calorimetry (DSC).

The aromatic polyether ketone resin (I) preferably has a melting point of 300° C. or higher, and more preferably 320° C. or higher. A melting point in the above range enables to improve the heat resistance of the molded article to be obtained. The melting point is measured by a differential scanning calorimetry (DSC).

The fluororesin (II) is a copolymer of tetrafluoroethylene (TFE) and a perfluoroethylenic unsaturated compound represented by the following formula (1):

$$CF_2=CF-R_f^1 \qquad (1)$$

wherein $R_f^1$ represents $-CF_3$ or $-OR_f^2$, and $R_f^2$ represents a C1 to C5 perfluoroalkyl group. The fluororesin (II) may be one fluororesin or two or more fluororesins. In the case that the $R_f^1$ is $-OR_f^2$, the $R_f^2$ is preferably a C1 to C3 perfluoroalkyl group.

The perfluoroethylenic unsaturated compound represented by formula (1) is preferably at least one selected from the group consisting of hexafluoropropylene, perfluoro(methyl vinyl ether), perfluoro(ethyl vinyl ether), and perfluoro(propyl vinyl ether), and more preferably at least one selected from the group consisting of hexafluoropropylene and perfluoro(propyl vinyl ether).

The fluororesin (II) is preferably a perfluoropolymer, for a low coefficient of kinetic friction.

The fluororesin (II) preferably consists of 90 to 99 mol % of TFE and 1 to 10 mol % of the perfluoroethylenic unsaturated compound represented by formula (1). More preferably, the fluororesin (II) consists of 93 to 99 mol % of TFE and 1 to 7 mol % of the perfluoroethylenic unsaturated compound represented by formula (I).

The fluororesin (II) preferably has a melt flow rate (MFR) of 0.1 to 100 g/10 min, and more preferably 10 to 40 g/10 min when measured at 372° C. under a load of 5000 g. An MFR in the above range enables to decrease the coefficient of kinetic friction of the molded article to be produced from the resin composition of the present invention, and also the limiting PV value can be improved. The lower limit of the MFR is still more preferably 12 g/10 min, and particularly preferably 15 g/10 min. The upper limit of the MFR is still more preferably 38 g/10 min, and particularly preferably 35 g/10 min from the viewpoint of reducing the coefficient of kinetic friction.

The fluororesin (II) may have any melting point, but preferably has a melting point equal to or lower than the melting point of the aromatic polyether ketone resin (I) because the fluororesin (II) in molding is preferred to be already melt at the temperature where the aromatic polyether ketone resin (I) used in the molding is molten. For example, the melting point of the fluororesin (II) is preferably 230° C. to 350° C.

The fluororesin (II) may have been treated with fluorine gas or ammonia by a common method.

The resin composition of the present invention contains the aromatic polyether ketone resin (I) and the fluororesin (II) at a mass ratio (I):(II) of 95:5 to 50:50. A ratio in the above range enables to produce a molded article that has both a low coefficient of kinetic friction and a high limiting PV value. A mass ratio of the amount of the fluororesin (II) to the aromatic polyether ketone resin (I) of more than 50 is likely to decrease the strength, while a mass ratio of less than 5 may not achieve a sufficient coefficient of kinetic friction. The mass ratio is more preferably in the range of 90:10 to 60:40.

The fluororesin (II) in the resin composition of the present invention is dispersed as particles in the aromatic polyether ketone resin (I), and has an average dispersed particle size of 3.0 μm or smaller. Too large an average dispersed particle size leads to insufficient sliding properties. The lower limit may be any value, and may be 0.01 μm.

The average dispersed particle size of the fluororesin (II) is preferably 2.0 μm or smaller. An average dispersed particle size of 2.0 μm or smaller enables to obtain a molded article having a high limiting PV value.

The average dispersed particle size of the fluororesin (II) is more preferably 1.0 μm or smaller.

To prevent cracking and chipping of sliding members, aromatic polyether ketone having better impact resistance has always been desired. A technique of forming an alloy with a rubber component is commonly employed to improve the impact resistance of thermoplastic resins. An aromatic polyether ketone, however, is a thermoplastic resin having high heat resistance with a mold-processing temperature of higher than 350° C. These aromatic polyether ketones are typically molded at around 400° C. If the aromatic polyether ketone is alloyed with a rubber component, the rubber component will be deteriorated by heat during mold processing, which is not practical. Effective ways to improve the impact resistance of aromatic polyether ketones have not actually been found.

The present inventors have found that an average dispersed particle size of the fluororesin (II) of 1.0 μm or smaller not only enables to obtain a molded article having both a low coefficient of kinetic friction and a high limiting PV value, but also unexpectedly causes great improvement of the impact resistance of the molded article.

The average dispersed particle size of the fluororesin (II) is still more preferably 0.30 μm for obtaining a molded article having better impact resistance.

The average dispersed particle size of the fluororesin (II) can be determined by microscopically observing a pressed sheet of the resin composition of the present invention by a transmission electron microscope (TEM), and binarizing the obtained image by an optical analysis device.

The resin composition of the present invention contains the aromatic polyether ketone resin (I) and the fluororesin (II), and may optionally further contain other component(s). The other component(s) may be any of the components including fibrous reinforcing agents such as whiskers (e.g. potassium titanate whiskers), glass fibers, asbestos fibers, carbon fibers, ceramic fibers, potassium titanate fibers, aramid fibers, and other high-strength fibrous reinforcing agents; inorganic fillers such as calcium carbonate, talc, mica, clay, carbon powder, graphite, and glass beads; colorants; commonly used inorganic or organic fillers such as flame retardants; stabilizers such as minerals and flakes; lubricants such as silicone oil and molybdenum disulfide; pigments; conducting agents such as carbon black; impact resistance improvers such as rubber; and other additives.

The resin composition of the present invention may be produced by any method under ordinary conditions, using a mixer typically used for mixing resin compositions such as a composition for molding. Examples of the mixer include mixing mills, Banbury mixers, pressure kneaders, and extruders. The mixer is preferably a twin screw extruder, particularly a twin screw extruder that has a screw structure with a large L/D.

Examples of the method of producing the resin composition of the present invention include a method of mixing the aromatic polyether ketone resin (I) and the fluororesin (II) in a molten state.

Sufficient kneading of the aromatic polyether ketone resin (I) and the fluororesin (II) can give the desired dispersion state to the resin composition of the present invention. The dispersion state affects the coefficient of kinetic friction and limiting PV value of the molded article, and thus an appropriate mixing method should be selected to achieve the desired dispersion state in the pressed sheet to be obtained from the resin composition.

Examples of the method of producing the resin composition of the present invention include a method of charging a mixer with the aromatic polyether ketone resin (I) and the fluororesin (II) at a proper ratio, optionally adding the above other component(s), and melt-kneading the resins (I) and (II) at their melting points or higher.

The other component(s) may be mixed independently with the aromatic polyether ketone resin (I) and the fluororesin (II) before the kneading of the resins (I) and (II), or may be mixed with the aromatic polyether ketone resin (I) and the fluororesin (II) when these resins are mixed.

The temperature for the melt-kneading may be appropriately determined depending on the conditions such as the kinds of the aromatic polyether ketone resin (I) and the fluororesin (II) to be used. Preferably, the temperature is 360° C. to 400° C., for example. The kneading time is usually one minute to one hour.

The resin composition can give a molded article having a coefficient of kinetic friction of 0.21 or less. A coefficient of kinetic friction in the above range allows its molded article to be suitable for use as a sliding member.

The resin composition can give its molded article a limiting PV value of 800 or higher, more preferably 1300 or higher, and still more preferably 1500 or higher.

The resin composition can give a notched Izod strength of 30 kJ/m$^2$ or higher to its molded article. The notched Izod strength is preferably 40 kJ/m$^2$ or higher. For a high Izod strength, the average dispersed particle size of the fluororesin (II) should be controlled to 1.0 μm or smaller.

A molded article formed from the resin composition of the present invention is another aspect of the present invention.

The molded article formed from the resin composition of the present invention has, in addition to the sliding properties and the impact resistance, heat resistance, chemical resistance, solvent resistance, strength, rigidity, low chemical agent permeability, dimensional stability, flame retardancy, electrical properties, and durability. In the electrical, electronic, and semiconductor fields, the molded article can be used for components of semiconductor and liquid crystal device manufacturing devices (e.g. a CMP retainer ring, an etching ring, a silicon wafer carrier, and an IC chip tray), insulating films, small button cells, cable connectors, and aluminum electrolytic condenser body casings. In the automobile field, the molded article can be used for thrust washers, oil filters, gears for auto air-conditioner controlling units, gears of throttle bodies, ABS parts, AT seal rings, MT shift fork pads, bearings, seals, and clutch rings. In the industrial field, the molded article can be used for compressor components, cables of a mass transport system, conveyor belt chains, connectors for oil field development machinery, and pump components of a hydraulic pressure driver system (e.g. bearings, port plates, ball joints of a piston). In the aerospace field, the molded article can be used for interior components in an aircraft cabin, wire covering, cable protection, and fuel pipe protecting materials. The molded article can also be used for other products such as food and beverage production equipment components, and medical instruments (e.g. sterile instruments, gas and liquid chromatographs).

The molded article may have any of a variety of shapes, such as a coating material shape, sheet shape, film shape, rod shape, and pipe shape.

Another aspect of the present invention is a molded article for a sliding member obtained from the resin composition. A molded article for a sliding member which is formed from the above resin composition has a low coefficient of kinetic friction, and thus is suitable for use as a sliding member. Since the molded article contains a fluororesin, the molded article is also excellent in properties such as chemical resistance, weather resistance, non-adhesiveness, water repellence, and electrical properties. Examples of the molded article for sliding members include, but not particularly limited to, sealants, gears, actuators, pistons, bearings, bearing retainers, bushings, switches, belts, bearings, cams, rollers, and sockets.

The molding machine in the method of producing a molded article may be used with the known parameters, for example, or any other parameters. The molding temperature is usually preferred to be equal to or higher than the melting point of the aromatic polyether ketone resin (I) to be used. Also, the molding temperature is preferred to be lower than the lower temperature of the decomposition temperature of the fluororesin (II) and the decomposition temperature of the aromatic polyether ketone resin (I). The molding temperature may be, for example, 250° C. to 400° C.

The molded article of the present invention can be formed by a molding method commonly used for a thermoplastic resin composition, such as the injection molding, extrusion molding, press molding, blow molding, calender molding, and casting molding, depending on the kind, use, and shape of the molded article to be obtained. The molded article may also be produced by a molding method which is a combination of the above molding methods. The molded article may be obtained through composite molding of the resin composition of the present invention and other polymer(s).

EXAMPLES

The present invention is described in the following examples. The present invention is not limited to these examples.

<Measurement of MFR>

In accordance with ASTM D3307-01, the mass (g/10 min) of the polymer flowing out from the nozzle (inner diameter: 2 mm, length: 8 mm) of a melt indexer (product of Toyo Seiki Seisaku-sho, Ltd.) at 372° C. under a load of 5000 g was determined.

<Production of Pressed Sheet Molded Article>

The resin compositions produced in the examples and comparative examples each were compression molded in a heat press molding machine at 380° C. and 5 MPa, so that 3-mm-thick sheets were produced.

<Determination of Limiting PV Value>

Each pressed sheet obtained by the above method was cut into a 3 cm (length)×3 cm (width)×3 mm (thickness) specimen. The limiting PV value of the specimen was determined in accordance with the A method of JIS K7218, using a friction and wear tester (product of A&D Company, Limited) and a steel material S45C (#240 sandpaper finishing) as an opposite material. The speed was constant at 3 m/sec, and the surface pressure was increased by 20 N from 20 N every 10 minutes.

<Measurement of Coefficient of Kinetic Friction>

The coefficient of kinetic friction of the pressed sheet obtained by the method described above was determined using a ball-on-disk SRV friction wear tester (product of OPTIMOL) at room temperature and 50 Hz.

<Measurement of Notched Izod Strength>

In accordance with JIS K7110, a specimen for notched Izod strength measurement was cut out from the pressed sheet produced by the method described above, and the notched Izod strength was measured at room temperature using an Izod impact tester (product of Toyo Seiki Seisaku-sho, Ltd.).

<Calculation of Average Dispersed Particle Size>

The pressed sheet produced by the method described above was trimmed to have a 1-mm-square tip by a razor for trimming. The sheet was then fixed in the sample holder of an ultramicrotome (ULTRACUT S, product of Leica Microsystems), and the chamber was cooled with liquid nitrogen to −80° C. inside. Thereby, a 90-nm-thick ultrathin section was cut out from the specimen. The ultrathin section obtained was taken out using a platinum ring to which a 20% ethanol solution was deposited. The ultrathin section was adhered to a copper mesh sheet (product of Okenshoji Co., Ltd., 200 A, φ3.0 mm).

The ultrathin section adhered to the copper mesh sheet was observed using a transmission electron microscope (H7100FA, product of Hitachi, Ltd.).

A negative film obtained through the microscopic observation was scanned into an electronic image using a scanner (GT-9400UF, product of EPSON). The electronic image was binarized by an optical analyzer (LUZEX AP, product of Nireco), so that the average dispersed particle size of the dispersed phase was determined.

The following materials were used in the examples and comparative examples.

Aromatic polyether ketone resin (I): Polyether ether ketone (trade name: 450G, product of Victrex Japan Inc.)

Fluororesin (II-1): Tetrafluoroethylene/hexafluoropropylene copolymer (composition weight ratio: tetrafluoroethylene/hexafluoropropylene/perfluoro(propyl vinyl ether)= 87.5/11.5/1.0, MFR: 27 g/10 min)

Fluororesin (II-2): Tetrafluoroethylene/perfluoroalkyl vinyl ether copolymer (composition weight ratio: tetrafluoroethylene/perfluoro(propyl vinyl ether)=94.5/5.5, MFR: 23 g/10 min)

Fluororesin (III): Polytetrafluoroethylene (trade name: LUBRON L5, product of Daikin Industries, Ltd.)

Fluororesin (IV): Ethylene/tetrafluoroethylene copolymer (trade name: Neoflon EP541, product of Daikin Industries, Ltd.)

Examples 1 and 2>

A melt-kneading device (trade name: Labo Plastomill, product of Toyo Seiki Seisaku-sho, Ltd.) was charged with the aromatic polyether ketone resin (I) and the fluororesin (II) at the ratio (parts by mass) shown in Table 1. The materials were melt-kneaded for 10 minutes at a temperature of 380° C. and a screw rotational speed of 80 rpm, whereby a resin composition was produced. The obtained resin composition was formed into a pressed sheet by the method described above, and the limiting PV value, coefficient of kinetic friction, and notched Izod strength of the sheet were determined. Also, an ultrathin section was cut out from the pressed sheet, so that the average dispersed particle size of the fluororesin (II) was calculated.

Examples 3 to 6

The aromatic polyether ketone resin (I) and the fluororesin (II) were preliminarily mixed at the ratio (parts by mass) shown in Table 1. Then, the mixture was melt-kneaded by a twin screw extruder (φ15 mm, L/D=60) at a cylinder temperature of 380° C. and a screw rotation speed of 350 rpm, whereby a resin composition was produced. The obtained resin composition was formed into a specimen by the method described above, and the limiting PV value, coefficient of kinetic friction, and notched Izod strength were determined. The average dispersed particle size of the fluororesin (II) was also calculated.

Comparative Example 1

A specimen was produced by the method described above from only the aromatic polyether ketone resin (I), and the limiting PV value, coefficient of kinetic friction, and notched Izod strength were determined.

Comparative Examples 2 and 3

The aromatic polyether ketone resin (I) and the fluororesin (III) or fluororesin (IV) were preliminarily mixed at the ratio (parts by mass) shown in Table 1. Then, the mixture was melt-kneaded by a twin screw extruder (φ15 mm, L/D=60) at a cylinder temperature of 380° C. and a screw rotation speed of 350 rpm, whereby a resin composition was produced. The obtained resin composition was formed into a pressed sheet by the method described above, and the limiting PV value, coefficient of kinetic friction, and notched Izod strength were determined. Also, an ultrathin section was cut out from the pressed sheet, so that the average dispersed particle size of the fluororesin (II) was calculated.

TABLE 1

|  | Example 1 | Example 2 | Example 3 | Example 4 | Example 5 | Example 6 | Comparative Example 1 | Comparative Example 2 | Comparative Example 3 |
|---|---|---|---|---|---|---|---|---|---|
| Polyether ketone resin (I) | 80 | 80 | 80 | 60 | 80 | 60 | 100 | 80 | 80 |
| Fluororesin (II-1) | 20 |  | 20 | 40 |  |  |  |  |  |
| Fluororesin (II-2) |  | 20 |  |  | 20 | 40 |  |  |  |
| Fluororesin (III) |  |  |  |  |  |  |  | 20 |  |
| Fluororesin (IV) |  |  |  |  |  |  |  |  | 20 |

TABLE 1-continued

|   | Example 1 | Example 2 | Example 3 | Example 4 | Example 5 | Example 6 | Comparative Example 1 | Comparative Example 2 | Comparative Example 3 |
|---|---|---|---|---|---|---|---|---|---|
| Average dispersed particle size (μm) | 1.54 | 1.90 | 0.13 | 0.22 | 0.18 | 0.25 | — | 73 | 2.80 |
| Limiting PV value (kPa · m/s) | 900 | 1000 | 1500 | 1600 | 1700 | 1850 | 750 | 600 | 750 |
| Coefficient of kinetic friction | 0.21 | 0.19 | 0.18 | 0.16 | 0.17 | 0.15 | 0.24 | 0.15 | 0.23 |
| Notched Izod strength (kJ/m²) | 17 | 17 | 55 | 70 | 50 | 70 | 17 | 10 | 15 |

The results of Comparative Example 3 show that use of an ethylene/tetrafluoroethylene copolymer as a fluororesin improves neither the coefficient of kinetic friction nor the wear resistance. Addition of polytetrafluoroethylene decreased the coefficient of kinetic friction as seen from the results of Comparative Example 2, but did not affect the wear resistance.

INDUSTRIAL APPLICABILITY

The resin composition of the present invention is suitable for molding materials used for components such as automobile components, industrial components, and electrical and electronic components which are required to have high sliding properties.

The invention claimed is:

1. A molded article comprising a resin composition, said resin composition comprising
an aromatic polyether ketone resin (I), and
a fluororesin (II),
the fluororesin (II) being a copolymer of tetrafluoroethylene and a perfluoroethylenic unsaturated compound represented by the following formula (I):

$$CF_2=CF-R_f^1 \qquad (1)$$

wherein $R_f^1$ represents $-CF_3$ or $-OR_f^2$, and $R_f^2$ represents a C1 to C5 perfluoroalkyl group;
the composition comprising the aromatic polyether ketone resin (I) and the fluororesin (II) at a mass ratio (I):(II) of 95:5 to 50:50;
the fluororesin (II) being dispersed as particles in the aromatic polyether ketone resin (I) and having an average dispersed particle size of 2.0 μm or smaller, and said molded article having a limiting PV value of 800 kPa·m/s or higher.

2. The molded article according to claim 1, wherein the fluororesin (II) has an average dispersed particle size of 0.30 μm or smaller.

3. The molded article according to claim 1, wherein the fluororesin (II) has a melt flow rate of 0.1 to 100 g/10 min.

4. The molded article according to claim 1, wherein the aromatic polyether ketone resin (I) is a polyether ether ketone.

5. The molded article according to claim 1, for use as a sliding member.

6. The molded article according to claim 1, which is a sealant, gear, actuator, piston, bearing, or bushing.

7. The molded article according to claim 1, having a limiting PV value of 1300 kPa·m/s or higher.

* * * * *